US012807207B2

(12) United States Patent
Adamowicz et al.

(10) Patent No.: US 12,807,207 B2
(45) Date of Patent: Nov. 24, 2026

(54) MINI-STROLLER GEAR MECHANISM

(71) Applicant: MONAHAN PRODUCTS, LLC, Rockland, MA (US)

(72) Inventors: Mark Adamowicz, Sutton, MA (US); Julianne Marie Depardieu, South Boston, MA (US); Matthew Luis Rivera, Hanson, MA (US); Richard M. Bastien, Cumberland, RI (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 216 days.

(21) Appl. No.: 18/820,810

(22) Filed: Aug. 30, 2024

(65) Prior Publication Data

US 2026/0062045 A1 Mar. 5, 2026

(51) Int. Cl.
*B62B 7/06* (2006.01)

(52) U.S. Cl.
CPC .................................... *B62B 7/066* (2013.01)

(58) Field of Classification Search
None
See application file for complete search history.

(56) References Cited

U.S. PATENT DOCUMENTS

| | | | | |
|---|---|---|---|---|
| 4,614,454 A | | 9/1986 | Kassai | |
| 5,590,896 A | | 1/1997 | Eichhorn | |
| 5,634,654 A | * | 6/1997 | Lin | B62B 7/06 280/47.38 |
| 6,102,431 A | * | 8/2000 | Sutherland | B62B 7/08 280/646 |
| 7,798,515 B2 | | 9/2010 | Valdez et al. | |
| 8,226,111 B2 | | 7/2012 | Valdez et al. | |
| 2014/0167393 A1 | * | 6/2014 | Tsai | B62B 7/064 280/650 |
| 2017/0066465 A1 | * | 3/2017 | Hanson | B62B 9/082 |
| 2022/0266888 A1 | * | 8/2022 | Zhong | B62B 7/08 |

FOREIGN PATENT DOCUMENTS

| | | | | | |
|---|---|---|---|---|---|
| CN | 101638103 A | * | 2/2010 | B62B 7/08 |
| CN | 202557583 U | * | 11/2012 | B62B 7/066 |
| CN | 112009549 A | * | 12/2020 | B62B 9/00 |
| CN | 113335361 A | * | 9/2021 | B62B 7/06 |
| CN | 215 322 806 U | | 12/2021 | |
| CN | 117 002 597 A | | 11/2023 | |
| DE | 112022004176 T5 | | 8/2024 | |
| NL | 2004371 C2 | * | 9/2011 | B62B 7/062 |

OTHER PUBLICATIONS

Notification of Transmittal of the International Search Report and the Written Opinion of PCT Application No. PCT/US2025/041460 mailed Dec. 11, 2025.

* cited by examiner

*Primary Examiner* — John Olszewski
(74) *Attorney, Agent, or Firm* — Lando & Anastasi, LLP

(57) ABSTRACT

A stroller includes a frame having a front wheel frame, a back wheel frame, and a handlebar frame, a first linkage coupled to the back wheel frame and the handlebar frame, and a second linkage coupled to the back wheel frame and the front wheel frame. The first linkage and the second linkage are configured to enable movement of the frame between an open, operational position and a closed, collapsed position. The stroller further includes a gear mechanism coupled to the first linkage and the second linkage. The gear mechanism includes a first gear coupled to the first linkage and a second gear coupled to the second linkage. The first gear and the second gear rotate relative to one another.

23 Claims, 5 Drawing Sheets

MINI-STROLLER GEAR MECHANISM

BACKGROUND

The present disclosure is directed to child conveyance devices, for example, strollers, and more particularly to a gear mechanism configured to expand the stroller to a fully open, operating position and to collapse the stroller to a fully closed, collapsed position.

A stroller is generally a chair-like carriage with wheels for transporting a baby or child. Some strollers may include a single seat for receiving a single passenger for transporting, while other types of strollers include two or more seats. Strollers may include a set of four wheels or may be in a tricycle configuration including three wheels. As its name implies, mini-strollers are compact, lightweight strollers particularly useful for travel and travel-related uses.

SUMMARY

One aspect of the present disclosure is directed to a stroller comprising a frame including a front wheel frame, a back wheel frame, and a handlebar frame, a first linkage coupled to the back wheel frame and the handlebar frame, and a second linkage coupled to the back wheel frame and the front wheel frame. The first linkage and the second linkage are configured to enable movement of the frame between an open, operational position and a closed, collapsed position. The stroller further comprises a gear mechanism coupled to the first linkage and the second linkage. The gear mechanism includes a first gear coupled to the first linkage and a second gear coupled to the second linkage. The first gear and the second gear rotate relative to one another.

Embodiments of the stroller further may include a locking mechanism coupled to the handlebar frame. The locking mechanism may be configured to lock the frame in the operational position in a locked condition and to enable the frame to achieve the collapsed position in an unlocked condition. The locking mechanism may be activated by a release button provided on a handlebar portion of the handlebar frame. The first linkage may include a first linkage bar provided on a first side of the stroller and a second linkage bar provided on a second side of the stroller. The first gear may be coupled to the first linkage bar. The second linkage may include a first two-part linkage provided on the first side of the stroller and a second two-part linkage provided on the second side of the stroller. The second gear may be coupled to the first two-part linkage. The frame further may include a seat frame coupled to the second linkage. The second linkage further may include a first linkage segment coupled to the first two-part linkage and the seat frame and a second linkage segment coupled to the second two-part linkage and the seat frame. The first two-part linkage may include a first link having a curved end and the second two-part linkage includes a second link having a curved end. The first link may be secured to the second gear of the gear mechanism. The first linkage bar of the first linkage may be secured to the first gear of the gear mechanism. The front wheel frame, the back wheel frame, and the handlebar frame each may be pivotally connected to a first bracket provided on the first side of the stroller and a second bracket provided on the second side of the stroller. The first linkage bar may include a first end secured to the first gear of the gear mechanism and a second end pivotally secured to a first frame member of the handlebar frame. The first two-part linkage may include a first end secured to the second gear of the gear mechanism and a second end pivotally secured to a first frame member of the front wheel frame. The second linkage may include a first two-part linkage provided on the first side of the stroller and a second two-part linkage provided on the second side of the stroller. The second gear may be coupled to the first two-part linkage. The frame further may include a seat frame coupled to the second linkage and the first bracket and the second bracket. The second linkage further may include a first linkage segment coupled to the first two-part linkage and the seat frame and a second linkage segment coupled to the second two-part linkage and the seat frame. The stroller further may include at least one wheel coupled to the front wheel frame and at least one back wheel coupled to the back wheel frame. The first gear may be larger than the second gear. A gear ratio of the first gear and the second gear may be 1.5:1. A gear ratio of the first gear and the second gear may be less than 1:1.

Another aspect of the present disclosure is directed to a method of opening and closing a stroller. In one embodiment, the method comprises: coupling a first linkage to a back wheel frame and a handlebar frame of a frame; coupling a second linkage to the back wheel frame and a front wheel frame of the frame; coupling a gear mechanism to the first linkage and the second linkage, the gear mechanism including a first gear coupled to the first linkage and a second gear coupled to the second linkage; and rotating the frame and the first and second linkages between an open, operational position and a closed, collapsed position. The first gear and the second gear rotate relative to one another.

Embodiments of the method further may include locking the stroller in the operational position with a locking mechanism coupled to the handlebar frame. The locking mechanism may be configured to lock the frame in the operational position in a locked condition and to enable the frame to achieve the collapsed position in an unlocked condition. The method further may include activating the locking mechanism by a release button provided on a handlebar portion of the handlebar frame. The method further may include coupling a seat frame of the frame to the second linkage. The first linkage may include a first linkage bar provided on a first side of the stroller and a second linkage bar provided on a second side of the stroller, the first gear being coupled to the first linkage bar. The second linkage may include a first two-part linkage provided on the first side of the stroller and a second two-part linkage provided on the second side of the stroller, the second gear being coupled to the first two-part linkage. The first two-part linkage may include a first link having a curved end and the second two-part linkage may include a second link having a curved end. The first link may be secured to the second gear of the gear mechanism. The first gear is larger than the second gear. A gear ratio of the first gear and the second gear may be 1.5:1.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
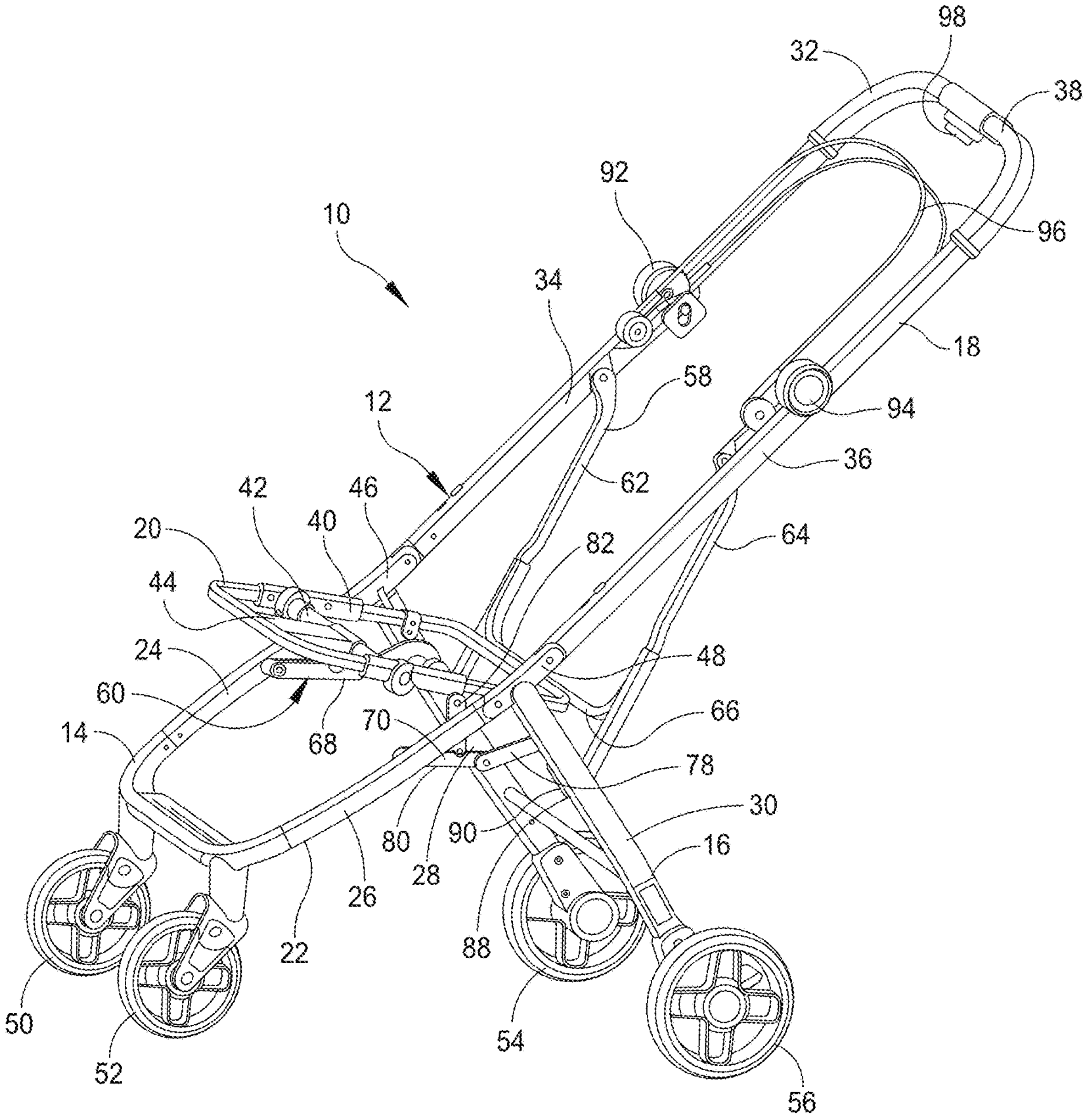
FIG. 1 is a perspective view of a stroller having a gear mechanism of an embodiment of the disclosure.

Parents or caregivers of young children or babies may transport a child in a child conveyance device, such as a stroller. A special category of strollers, sometimes referred to as mini-strollers, are particularly suited for travel due to their lightweight and compact size when in a fully collapsed position. Aspects and embodiments disclosed herein include a gear mechanism that is particularly suited to open and close the stroller to achieve operating and collapsed positions. Specifically, the gear mechanism operates with linkages to facilitate the quick deployment and collapse of the stroller. In one embodiment, the gear mechanism has a ratio particularly suited to achieve this function. Further, the gear mechanism is configured to prevent parts of the stroller from swinging open when in the collapsed position. Many known strollers use a hinge arrangement, which can swing free even when the stroller is closed.

The disclosure is not limited in its application to the details of construction and the arrangement of components set forth in the following description or illustrated in the drawings. The disclosure is capable of other examples and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional terms.

Figure 2:
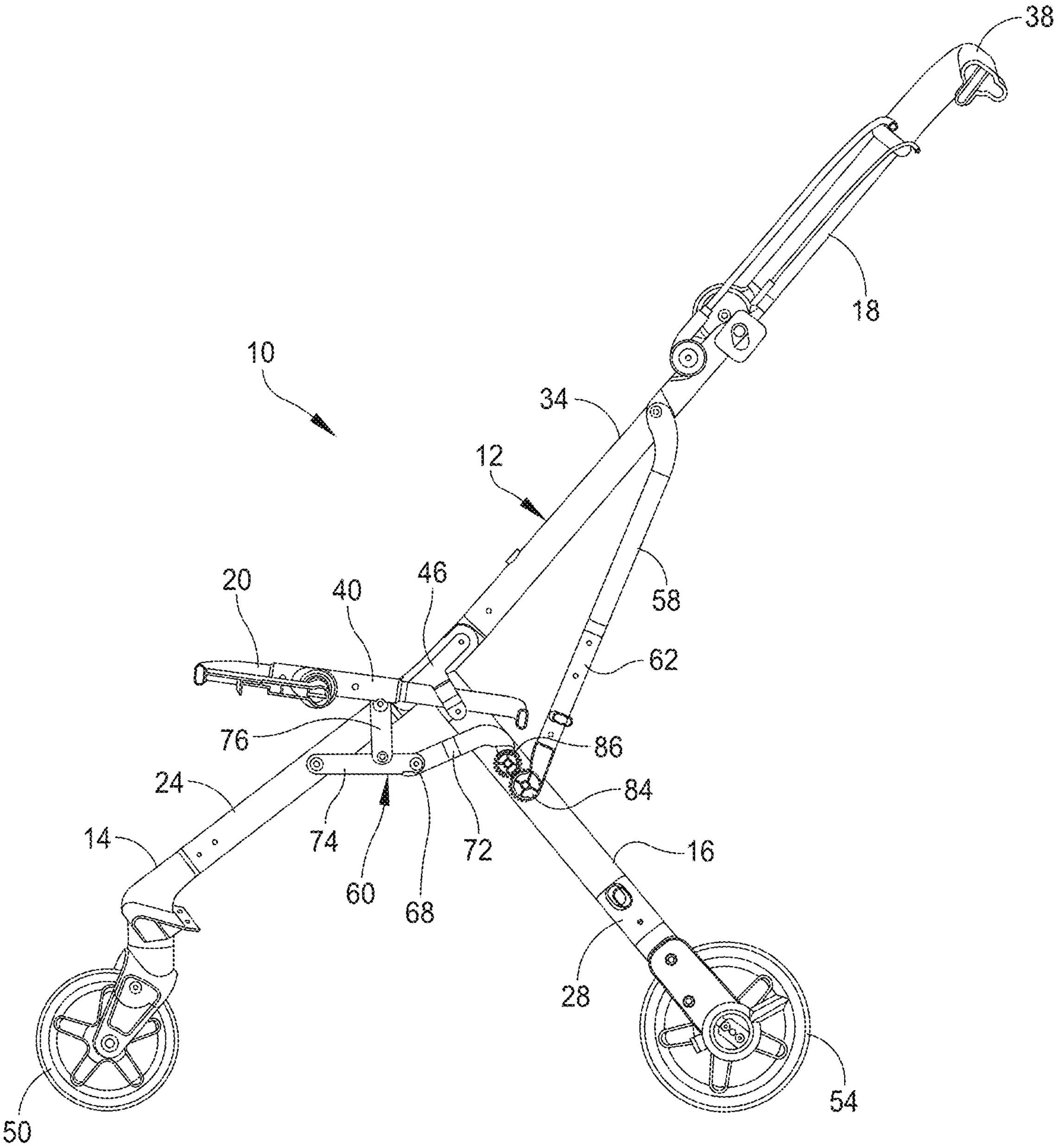
FIG. 2 is a cross-sectional side view of the stroller of FIG. 1.

Referring to the drawings, and more particularly to FIGS. 1 and 2, a stroller is generally indicated at 10. As shown, the stroller 10 includes a frame assembly, generally indicated at 12, which provides the support structure of the stroller 10. The frame assembly 12 includes a front wheel frame subassembly, indicated at 14, a back wheel frame subassembly, indicated at 16, a handlebar frame subassembly, indicated at 18, and a seat frame subassembly, indicated at 20. In one embodiment, the components of the frame assembly 12 are fabricated from strong, lightweight material, such as aluminum or an aluminum alloy. In the shown position, the stroller 10 is ready for use, with the front wheel frame subassembly 14 and the handlebar frame subassembly 18 generally lying along a common plane, and the back wheel frame subassembly 16 extending generally perpendicularly from the front wheel frame subassembly 14 and the handlebar frame subassembly 18 at the junction of the front wheel frame subassembly 14 and the handlebar frame subassembly 18. As will be discussed in greater detail below, the frame assembly 12, along with suitable linkage, is configured to move between an open, operational position and a closed, collapsed position.

The front wheel frame subassembly 14 includes a U-shaped frame member 22 having two spaced apart legs 24, 26, each with free ends. It should be noted that the U-shaped frame member 22 may include several separate frame members that are secured to one another to achieve the U-shaped construction. The back wheel frame subassembly 16 includes a first frame member 28 and a second frame member 30, which is spaced from the first frame member 28. The handlebar frame subassembly 18 includes an elongated U-shaped frame member 32 having two spaced apart legs 34, 36, each with free ends. As shown best in FIG. 1, in one embodiment, the elongated U-shaped frame member 32 of the handlebar frame subassembly 18 includes a first leg 34 and a second leg 36 extending from a handlebar 38. The first leg 34 and the second leg 36 may each be configured to pivot at midpoints along a length of the legs 34, 36 to facilitate the folding of the handlebar frame subassembly 18 to a compact position. The elongated U-shaped frame member 32 of the handlebar frame subassembly 18 has its free ends proximate to the free ends of the U-shaped frame member 22 of the front wheel frame subassembly 14 when assembled, with legs 24, 26 of the elongated U-shaped frame member 32 being longer than legs 34, 46 of the U-shaped frame member 22. The handlebar 38 is provided to enable an operator to push and control the movement of the stroller. As with the front wheel frame subassembly 14, the elongated U-shaped frame member 32 of the handlebar frame subassembly 18 may include separate frame members that are secured to one another to achieve the elongated U-shaped construction. It should be noted that that the parts constituting the front wheel frame subassembly 14, the rear wheel frame subassembly 16 and the handlebar frame subassembly 18 may each constitute a single parts or multiple parts.

Figure 3:
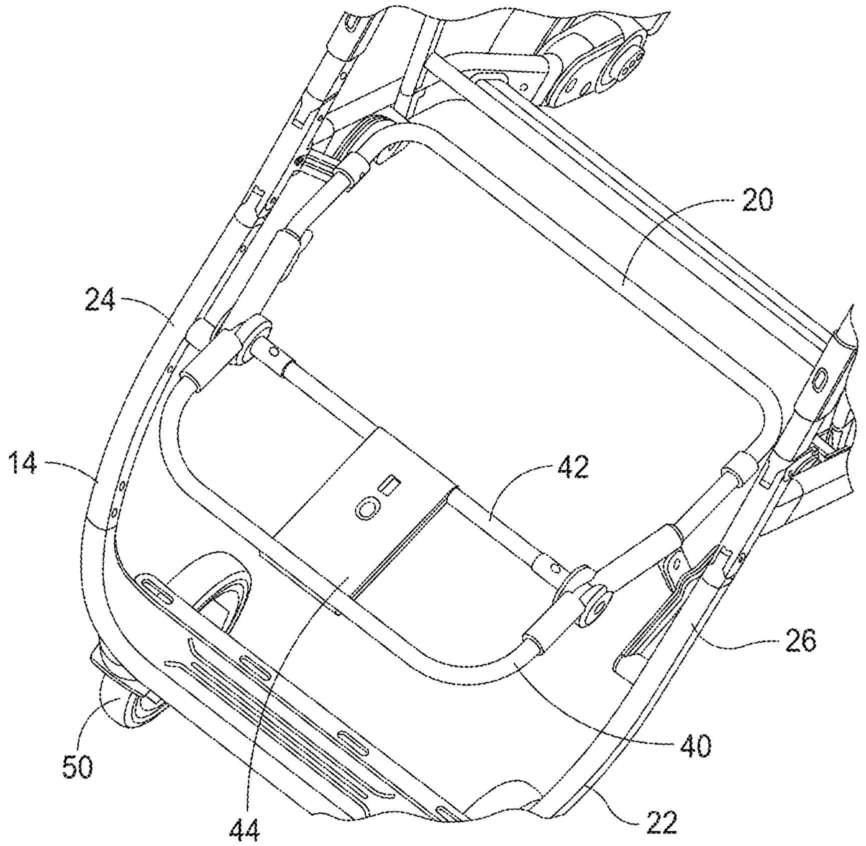
FIG. 3 is a perspective view of a seat frame subassembly of the stroller.

Referring additionally to FIG. 3, the seat frame subassembly 20 includes a generally rectangular frame member 40 and a cross-section member 42 that extends from one side of the rectangular frame member 40 to an opposite side of the rectangular frame member 40. The seat frame subassembly 20 further may include a footrest portion 44 that extends from the cross-section 42 member to a front end of the rectangular frame member 40. As with the front wheel frame subassembly 14 and the handlebar frame subassembly 18, the seat frame subassembly 20 may include separate frame members that are secured to one another to achieve the rectangular construction. Although not shown, a seat, such as a car seat, may be positioned on a seat pan formed by the rectangular frame member 40 and the cross-section member 42 of the seat frame subassembly 20 to enable the child to sit on the stroller 10 in comfort. Suitable connectors can be provided to secure the seat to the components of the seat pan, i.e., the rectangular frame member 40 and to the cross-section member 42, and to the legs 34, 36 of the elongated U-shaped frame member 32.

Each of the front wheel frame subassembly 14, the back wheel frame subassembly 16, the handlebar frame subassembly 18 and the seat frame subassembly 20 are coupled to a pair of support brackets, a first support bracket 46 and a second support bracket 48. The support brackets 46, 48 provide a pivot point about which the frame assembly 12 rotates when being moved between the open, operational position and the closed, collapsed position. Each of the first support bracket 46 and the second support 48 bracket includes a T-shaped body, with the first support bracket 46 being provided on a first side of the stroller 10 and the second support bracket 48 being provided on a second side of the stroller 10. In one embodiment, the manner in which the components of the frame subassemblies 14, 16, 18, 20 are secured to support brackets 46, 48 may be achieved by pin connectors to enable the relative pivoting of the components of the frame subassemblies 14, 16, 18, 20 with the support brackets 46, 48. Specifically, intersecting, attached components may be pinned together by suitable pin connectors to enable relative pivoting and rotational movement of the components.

Figure 4:
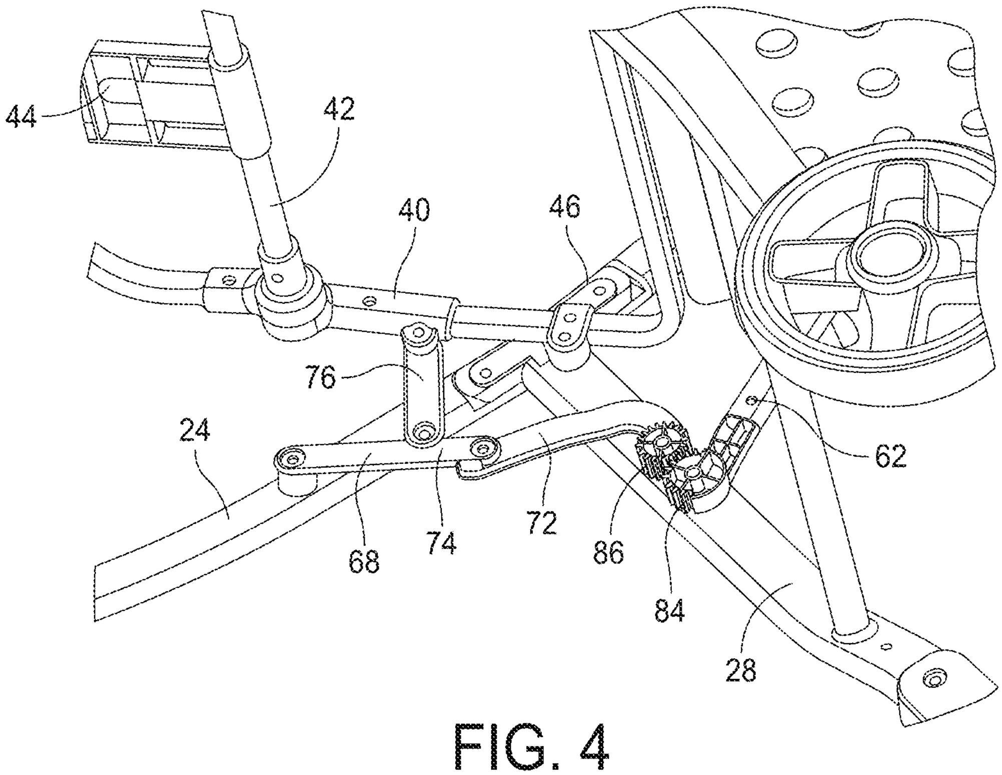
FIG. 4 is an enlarged perspective view of the gear mechanism.
Figure 5:
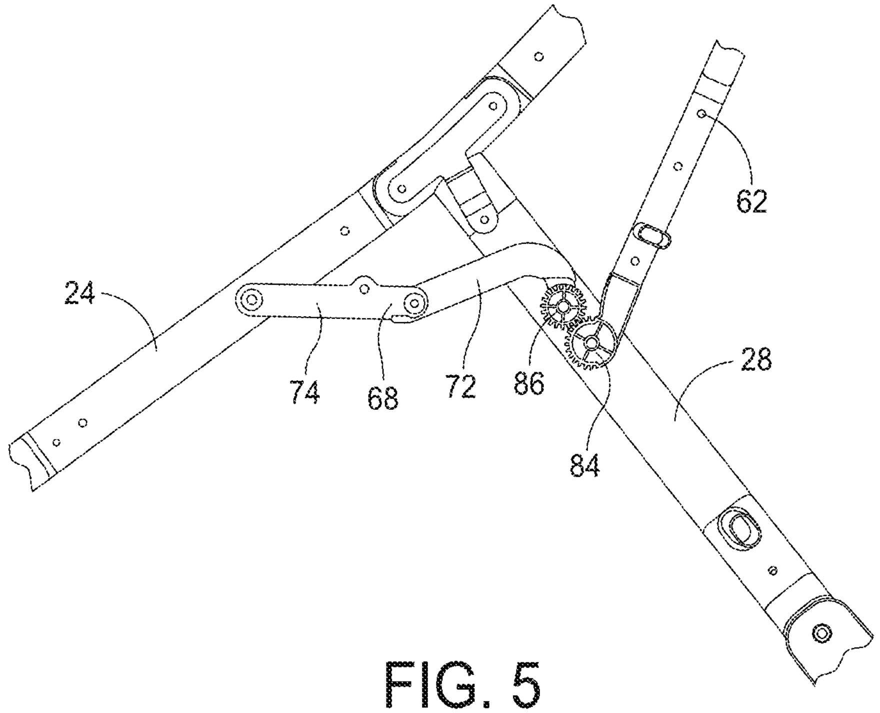
FIG. 5 is an enlarged side view of the gear mechanism.

Referring additionally to FIGS. 4 and 5, the free end of the first leg 24 of the U-shaped frame member 22 of the front wheel frame subassembly 14 is pivotally secured to the first support bracket 46 and the free end of the second leg 26 of the U-shaped frame member 22 is pivotally secured to the second support bracket 48. Although not shown, the legs 24, 26 of the U-shaped frame member 22 and/or the first and second support brackets 46, 48 may be configured with end stops that enable the U-shaped frame member 22 to pivot with respect to the support brackets 46, 48 in only one direction from a relatively straight or extended position.

As shown, two front wheels 50, 52 are secured to the U-shaped frame member 22 at a bottom of the U-shaped frame member 22. Each front wheel 50, 52 is secured to the U-shaped frame member 22 by a caster that enables 360-degree rotation of the wheel with respect to the U-shaped frame member 22. A first end of the first frame member 28 of the back wheel frame subassembly 16 is fixedly secured to the first support bracket 46 and a first end of the second frame member 30 is fixedly secured to the second support bracket 48. As shown, a first back wheel 54 is rotatably secured to a second end of the first frame member 28 of the back wheel frame subassembly 16 and a second back wheel 56 is rotatably secured to a second end of the second frame member 30. The back wheels 54, 56 are each secured to their respective frame member 28, 30 to rotate only in forward and backward directions. The front wheels 50, 52 provide the ability of the stroller 10 to steer in a desired direction. In one embodiment, the back wheels 54, 56 are larger than their corresponding front wheels 50, 52.

The free end of the first leg 34 of the elongated U-shaped frame member 32 of the handlebar frame subassembly 18 is pivotally secured to the first support bracket 46 and the free end of the second leg 36 of the elongated U-shaped frame member 32 is pivotally secured to the second support bracket 48. Although not shown, the legs 34, 36 of the elongated U-shaped frame member 32 and/or the first and second support brackets 46, 48 may be configured with end stops that enable the U-shaped frame member 32 to pivot with respect to the support brackets 46, 48 in only one direction from a relatively straight or extended position.

The stroller 10 further includes linkages that are configured to guide and support the motion of the frame assembly 12 between the open, operational position and the closed, collapsed position. Specifically, the stroller 10 includes a first linkage assembly, generally indicated at 58, which is coupled to the back wheel frame subassembly 16 and the handlebar frame subassembly 18. The stroller 10 further includes a second linkage assembly, generally indicated at 60, which is coupled to the front wheel frame subassembly 14 and the back wheel frame subassembly 16. As with the frame assembly 12, the manner in which the components of the linkage assemblies 58, 60 are secured to the components of the frame assembly 12 and the support brackets 46, 48 may be achieved by pin connectors to enable the relative pivoting of the components of the linkage assemblies 58, 60 with respect to the components of the frame assembly 12 and the support brackets 46, 48. Specifically, intersecting, attached components may be pinned together by suitable pin connectors to enable relative pivoting and rotational movement of the components. It should be noted that that the parts constituting the first linkage assembly 58 and the second linkage assembly 60 may each constitute a single parts or multiple parts.

In one embodiment, the first linkage assembly 58 includes a first linkage bar 62 provided on the first side of the stroller 10 and a second linkage bar 64 provided on the second side of the stroller 10. The first linkage bar 62 includes a first end coupled to the first frame member 28 of the back wheel frame subassembly 16 in the manner described below and a second end pivotally secured to the first leg 34 of the elongated U-shaped frame member 32 of the handlebar frame subassembly 18. Similarly, the second linkage bar 64 includes a first end coupled to the second frame member 30 of the back wheel frame subassembly 16 in the manner described below and a second end pivotally secured to the second leg 36 of the elongated U-shaped frame member 32 of the handlebar frame subassembly 18. The first linkage assembly 58 further may include a cross linkage member 66 that extends between the first linkage bar 62 and the second linkage bar 64 proximate the first ends of the first and second linkage bars 62, 64.

The second linkage assembly 60 includes a first two-part linkage 68 provided on the first side of the stroller 10 and a second two-part linkage 70 provided on the second side of the stroller 10. The first two-part linkage 68 includes a first link 72 and a second link 74, which are pivotally secured to one another at a midpoint of the first two-part linkage 68. The second linkage assembly 60 further includes a first linkage segment 76 that is pivotally secured to the second link 74 of the first two-part linkage 68 and to the rectangular frame member 40 of the seat frame subassembly 20 along the first side of the stroller 10. The first link 72 of the first two-part linkage 68 has a curved end, the purpose of which will be described in greater detail below. Similarly, the second two-part linkage 70 includes a third link 78 and a fourth link 80, which are pivotally secured to one another at a midpoint of the second two-part linkage 70. The second two-part linkage 70 further includes a second linkage segment 82 that is pivotally secured to the fourth link 80 and to the rectangular frame member 40 of the seat frame subassembly 20 along the second side of the stroller 10. The third link 78 of the second two-part linkage 70 has a curved end as well, the purpose of which will be described in greater detail below.

To facilitate and to quicken the movement of the stroller 10 between the open, operational position and the closed, collapsed position, the stroller 10 further includes a gear mechanism coupled to the first linkage assembly 58 and the second linkage assembly 60. As will be described in greater detail with reference to FIGS. 7A-7D below, the arrangement is that when unlocking the handlebar 38 in the manner described below and initially rotating the elongated U-shaped frame member 32 in a clockwise direction (as shown), the first linkage assembly 58 engages the gear mechanism to facility the movement of the front wheel frame subassembly 14 toward the back wheel frame subassembly. During this movement, the handlebar frame subassembly 18 collapses at a midpoint of the handlebar frame subassembly 18 toward the back wheel frame subassembly. The movement of the stroller 10 between the operational and collapsed positions will be described in greater detail below.

In one embodiment, the gear mechanism includes a first gear 84 and a second gear 86 provided on the first side of the stroller 10 and a third gear 88 and a fourth gear 90 provided on the second side of the stroller 10. The first gear 84 and the second gear 86 are each rotatably secured to the first frame member 28 on an inwardly facing surface of the first frame member 28. The first gear 84 has teeth configured to mesh with teeth of the second gear 86 when rotatably secured to the first frame member 28. The third gear 88 and the fourth gear 90 are each rotatably secured to the second frame member 30 on an inwardly facing surface of the second frame member 30. The third gear 88 has teeth configured to mesh with teeth of the fourth gear 90 when rotatably secured to the second frame member 30.

In one embodiment, the first gear 84 and the third gear 88 are each larger than their corresponding second gear 86 and fourth gear 90. In one embodiment, the gear ratio between the first gear 84 and the second gear 86 and the gear ratio between the third gear 88 and the fourth gear 90 are greater than 1:1. For example, the gear ratio between the first gear 84 and the second gear 86 and the gear ratio between the third gear 88 and the fourth gear 90 are each 1.5:1. As is known, the gear ratio is the ratio of the number of rotations of a driver gear, e.g., the first gear 84 and the third gear 88, to the number of rotations of a driven gear, e.g., the second gear 86 and the fourth gear 90. The gear ratio may also be defined as the ratio of the angular speed of the input gear to the angular speed of the output gear. It should be understood that the gear ratio between the first gear 84 and the second gear 86 and between the third gear 88 and the fourth gear 90 may be selected based on achieving a desired performance.

In other embodiments, the gears of the gear mechanism may be selected to be the same size, or the first gear 84 and the third gear 88 may be smaller than the second gear 86 and the fourth gear 90, respectively, thus having a gear ratio of less than 1:1. In this embodiment, the gear ratio of the gear mechanism is selected to slow the movement of the stroller to the open, operational position and the closed, collapsed position.

In another embodiment, the gears of the gear mechanism may be spring-loaded to assist rotation of the stroller to the open, operational position. This means, when moving the stroller to the closed, collapsed position, the bias of the spring must be overcome.

With particular reference to FIGS. 4 and 5, the first gear 84 is coupled to the first linkage assembly 58 and the second gear 86 is coupled to the second linkage assembly 60. Specifically, the first end of the first linkage bar 62 is fixedly secured to the first gear 84. The result is that pivotal movement of the first linkage bar 62 causes the rotation of the first gear 84. Similarly, the third gear 88 is coupled to the first linkage assembly 58 and the fourth gear 90 is coupled to the second linkage assembly 60. Specifically, the first end of the second linkage bar 64 is fixedly secured to the third gear 88. The result is that pivotal movement of the second linkage bar 64 causes rotation of the third gear 88. The arrangement is such that first linkage bar 62 and the second linkage bar 64 when pivoted by moving the handlebar frame subassembly 18 causes the simultaneous rotation of the first gear 84 and the third gear 88.

As noted above, the first link 72 of the first two-part linkage 68 has a curved end that is fixedly secured to the second gear 86 of the gear mechanism so that the first link 72 of the first two-part linkage 68 rotates when the second gear 86 rotates. Similarly, the third link 78 of the second two-part linkage 70 has a curved end that is fixedly secured to the fourth gear 90 of the gear mechanism so that the third link 78 of the second two-part linkage 70 rotates when the fourth gear 90 rotates. Thus, counterclockwise movement of the handlebar frame subassembly 18 causes the clockwise rotation of the first gear 84 and the third gear 88. The clockwise rotation of the first gear 84 and the second gear 88 causes the counterclockwise rotation of the second gear 86 and the fourth gear 90, respectively, which in turn causes the two-part linkages 68, 70 to collapse thereby drawing the U-shaped frame member 22 of the front wheel frame subassembly 14 toward the first and second frame members 28, 30 of the back wheel frame subassembly 16. The gear ratio of gears 84, 88 and gears 86, 90 as well as the curved ends of the two-bar linkages 68, 70 facilitate the quick movement of the stroller 10 to the closed, collapsed position.

Figure 6:
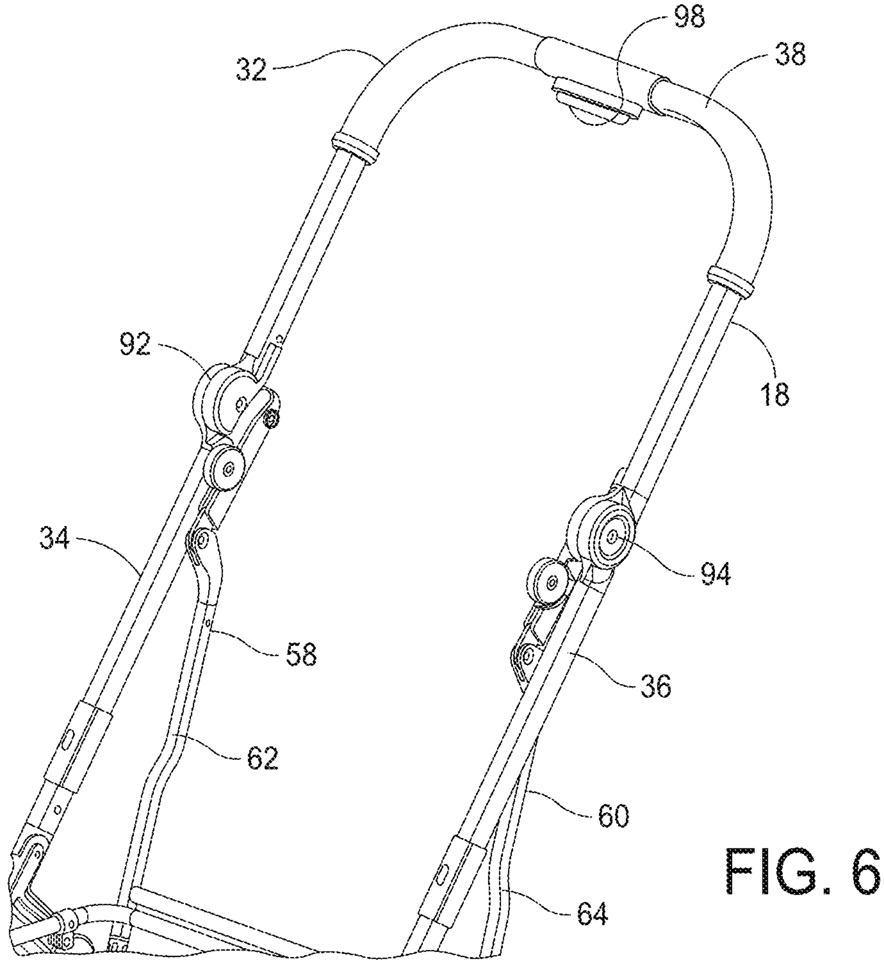
FIG. 6 is a perspective view of a handlebar frame subassembly of the stroller.

Referring additionally to FIG. 6, handlebar locking mechanism is provided to lock the handlebar frame subassembly 18, and, as will be described in greater detail below, the frame assembly 12 in the open, operational position. When the handlebar locking mechanism is in a locked condition, the stroller 10 is in the operational position. When the handlebar locking mechanism is in an unlocked condition, the frame assembly 12 of the stroller 10 is freed to achieve the collapsed position. As shown, the locking mechanism includes two locks, a first lock 92 provided on the first leg 34 of the elongated U-shaped frame member 32 and a second lock 94 provided on the second leg 36 of the elongated U-shaped frame member 32. In one embodiment, the first lock 92 and the second lock 94 are positioned at the midpoints of the first leg 34 and the second leg 36 where the elongated U-shaped frame member 34 is configured to pivot. A cable is provided in the handlebar 38 to connect the first lock 92 and the second lock 94 to a release button 98 provided on the handlebar 38 of the elongated U-shaped frame member 32. In one embodiment, the cable is provided in the handlebar 38 and the legs 34, 36 of the elongated U-shaped frame member 32 to connect the release button 98 to the first lock 92 and the second lock 94. The locking mechanism is designed to maintain the locked condition when the stroller 10 is in the operational position and, upon pressing the release button 98, release the locks 92, 94 to the unlocked condition to enable the stroller 10 to achieve the collapsed position.

In one embodiment, a canopy rod 96 may be provided to support a canopy used to cover the stroller 10 and to protect the occupant of the stroller 10.

Figure 7A:
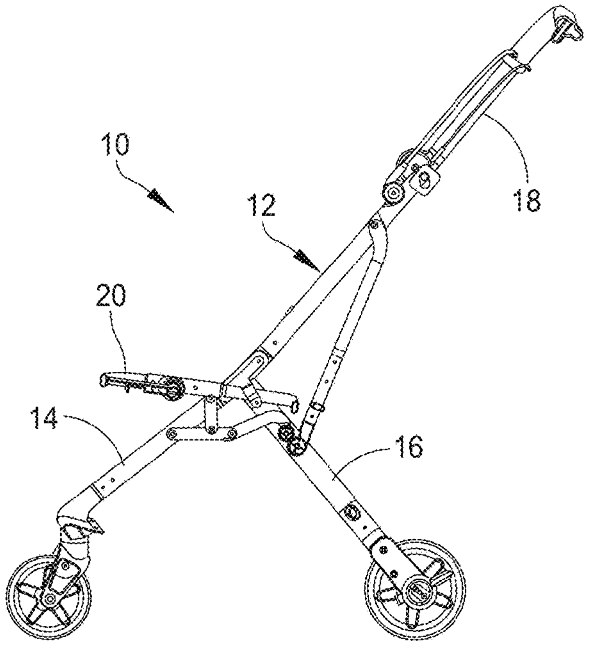
FIG. 7A is a side view of the stroller in a fully open, operating position.

During operation, the movement of the frame assembly 12 and the linkage assemblies 58, 60 of the stroller 10 is shown sequentially in FIGS. 7A-7D. FIG. 7A shows the stroller 10 in the fully open, operational position. As shown, the front wheel frame subassembly 14 and the handlebar frame subassembly 18 are fully extended to lie along a substantially common plane. The back wheel frame subassembly 16 is fully extended to be generally perpendicular to the plane defined by the front wheel frame subassembly 14 and the handlebar frame subassembly 18. In the position, the seat frame subassembly 20 extends in a generally forward direction to receive a seat or other suitable structure to support a child.

Figure 7B:
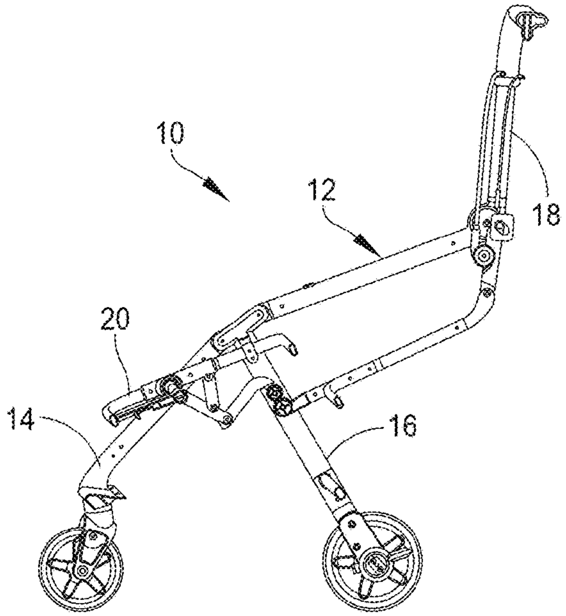
FIGS. 7B and 7C are side views showing the stroller in partially closed positions.

FIG. 7B shows the stroller 10 in a partially closed, collapsed position. To achieve this position, the release button 98 is pressed to unlock the first lock 92 and the second lock 94 of the stroller 10 to disengage the elongated U-shaped frame member 32 that is connected to the first linkage bar 62 and the second linkage bar 64, and the handlebar 38 is rotated counterclockwise about the first and second locks 92, 94 to begin collapsing the stroller 10. During this initial movement, the elongated U-shaped frame member 32 pivots at midpoints of legs 34, 36 at the locations of the first lock 92 and the second lock 94, and the first linkage rotates in a clockwise direction to rotate the first gear 84 and the third gear 88 in the clockwise direction. The rotation of the first gear 84 and the third gear 88 in the clockwise direction causes the rotation of the second gear 86 and the fourth gear 90 in the counterclockwise direction, which causes the second linkage assembly 60 to rotate counterclockwise as well. The second linkage assembly cause the rotation of the front wheel frame subassembly 14 and the seat frame subassembly 20 in the counterclockwise direction.

Figure 7C:
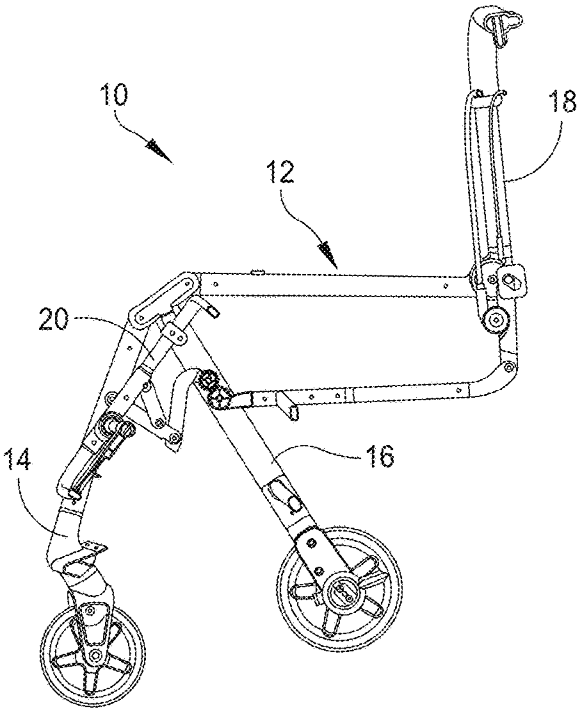

FIG. 7C shows the stroller 10 in a more partially closed, collapsed position. The handlebar 38 continues to be rotated counterclockwise to achieve the shown position. The elongated U-shaped frame member 32 continues to pivot at midpoints of legs 34, 36, and the front wheel frame subassembly 14 moves closer to the back wheel frame subassembly 16. The seat frame subassembly 20 continues to rotate counterclockwise as well.

Figure 7D:
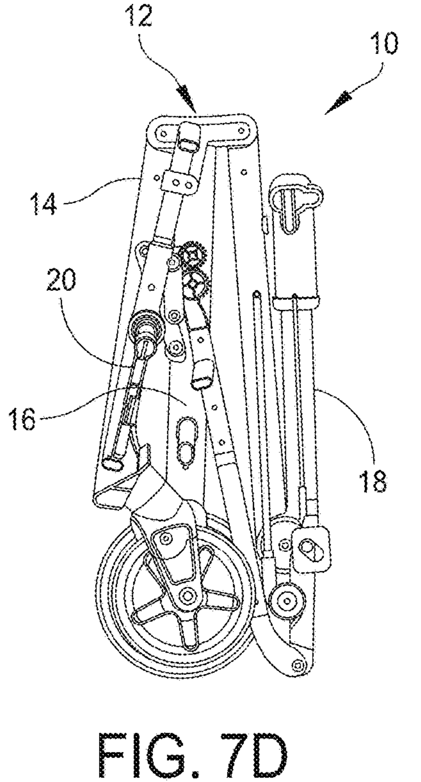
FIG. 7D is a side view showing the stroller in a fully closed, collapsed position.

FIG. 7D shows the stroller 10 in the fully closed, collapsed position. As shown, the front wheel frame subassembly 14 is in a nested position with respect to the back wheel frame subassembly 16 so that the wheels 50, 52 of the front wheel frame subassembly 14 are located inboard with respect to the back wheels 54, 56 of the back wheel frame subassembly 16. In this position, the handlebar frame subassembly 18 is positioned adjacent to the front and back wheel frame subassemblies 14, 16.

Aspects of the present disclosure are directed to a method of opening and closing the stroller 10. In one embodiment, the method includes coupling the first linkage assembly 58 to the back wheel frame subassembly 16 and the handlebar frame subassembly 18 of the frame assembly 12. Once coupled, the second linkage assembly 60 is coupled to the front wheel frame subassembly 14 and the back wheel frame subassembly 16 of the frame assembly 12. The gear mechanism is coupled to first linkage assembly 58 and the second linkage assembly 60. The gear mechanism includes the first gear 84 and the third gear 88 that are coupled to the first linkage assembly 58 and the second gear 86 and the fourth gear 90 that are coupled to the second linkage assembly 60. Once the frame subassemblies 14, 16, 18, the linkage assemblies 58, 60 and the gear mechanism are coupled with one another, the frame assembly 12 and the linkage assemblies 58, 60 are rotated between the open, operational position and the closed, collapsed position. As noted above, the provision of the first gear 84 and the third gear 88 being larger than the second gear 86 and the fourth gear 90 facilitate quick opening and closing of the stroller 10.

The method further may include locking the stroller 10 in the operational position with the locking mechanism coupled to the handlebar frame subassembly 18. In one embodiment, the locking mechanism is configured to lock the frame assembly 12 in the operational position in the locked condition and to enable the frame assembly 12 to achieve the collapsed position in the unlocked condition. The locking mechanism may be activated by the release button 98 provided on the handlebar 38 of the handlebar frame subassembly 18.

The method further may include coupling the seat frame subassembly 20 of the frame assembly 12 to the second linkage assembly 60.

The stroller 10 can be configured with accessories or other components. For example, as mentioned above, the seat pan of the stroller can be configured to be secured to a seat, such as a car seat. Other accessories can be included as well, such as a canopy optionally connected to the frame assembly 12 to protect a child sitting in a seat from the sun, rain or wind.

The materials of construction of the components of the frame assembly and the linkage may embody strong, lightweight materials, such as aluminum and aluminum alloys.

Having thus described several aspects of at least one embodiment of this disclosure, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A stroller comprising:

a frame including a front wheel frame, a back wheel frame, and a handlebar frame;

a first linkage coupled to the back wheel frame and the handlebar frame;

a second linkage coupled to the back wheel frame and the front wheel frame, the first linkage and the second linkage being configured to enable movement of the frame between an open, operational position and a closed, collapsed position; and a gear mechanism coupled to the first linkage and the second linkage, the gear mechanism including a first gear coupled to the first linkage and a second gear coupled to the second linkage, wherein the first gear and the second gear rotate relative to one another.

2. The stroller of claim 1, further comprising a locking mechanism coupled to the handlebar frame, the locking mechanism being configured to lock the frame in the operational position in a locked condition and to enable the frame to achieve the collapsed position in an unlocked condition.

3. The stroller of claim 2, wherein the locking mechanism is activated by a release button provided on a handlebar portion of the handlebar frame.

4. The stroller of claim 1, wherein the first linkage includes a first linkage bar provided on a first side of the stroller and a second linkage bar provided on a second side of the stroller, the first gear being coupled to the first linkage bar.

5. The stroller of claim 4, wherein the second linkage includes a first two-part linkage provided on the first side of the stroller and a second two-part linkage provided on the second side of the stroller, the second gear being coupled to the first two-part linkage.

6. The stroller of claim 5, wherein the frame further includes a seat frame coupled to the second linkage.

7. The stroller of claim 6, wherein the second linkage further includes a first linkage segment coupled to the first two-part linkage and the seat frame and a second linkage segment coupled to the second two-part linkage and the seat frame.

8. The stroller of claim 5, wherein the first two-part linkage includes a first link having a curved end and the second two-part linkage includes a second link having a curved end, the first link being secured to the second gear of the gear mechanism.

9. The stroller of claim 8, wherein the first linkage bar of the first linkage is secured to the first gear of the gear mechanism.

10. The stroller of claim 5, wherein the front wheel frame, the back wheel frame, and the handlebar frame are each pivotally connected to a first bracket provided on the first side of the stroller and a second bracket provided on the second side of the stroller.

11. The stroller of claim 10, wherein the first linkage bar includes a first end secured to the first gear of the gear mechanism and a second end pivotally secured to a first frame member of the handlebar frame.

12. The stroller of claim 11, wherein the first two-part linkage includes a first end secured to the second gear of the gear mechanism and a second end pivotally secured to a first frame member of the front wheel frame.

13. The stroller of claim 1, further comprising at least one wheel coupled to the front wheel frame and at least one back wheel coupled to the back wheel frame.

14. The stroller of claim 1, wherein the first gear is larger than the second gear.

15. The stroller of claim 1, wherein a gear ratio of the first gear and the second gear is 1.5:1.

16. The stroller of claim 1, wherein a gear ratio of the first gear and the second gear is less than 1:1.

17. A method of opening and closing a stroller, the method comprising:

coupling a first linkage to a back wheel frame and a handlebar frame of a frame;

coupling a second linkage to the back wheel frame and a front wheel frame of the frame;

coupling a gear mechanism to the first linkage and the second linkage, the gear mechanism including a first gear coupled to the first linkage and a second gear coupled to the second linkage; and rotating the frame and the first and second linkages between an open, operational position and a closed, collapsed position, wherein the first gear and the second gear rotate relative to one another.

18. The method of claim 17, further comprising locking the stroller in the operational position with a locking mechanism coupled to the handlebar frame, the locking mechanism being configured to lock the frame in the operational position in a locked condition and to enable the frame to achieve the collapsed position in an unlocked condition.

19. The method of claim 17, further comprising activating the locking mechanism by a release button provided on a handlebar portion of the handlebar frame.

20. The method of claim 17, further comprising coupling a seat frame of the frame to the second linkage.

21. The method of claim 17, wherein the first linkage includes a first linkage bar provided on a first side of the stroller and a second linkage bar provided on a second side of the stroller, the first gear being coupled to the first linkage bar, the second linkage includes a first two-part linkage provided on the first side of the stroller and a second two-part linkage provided on the second side of the stroller, the second gear being coupled to the first two-part linkage, and the first two-part linkage includes a first link having a curved end and the second two-part linkage includes a second link having a curved end, the first link being secured to the second gear of the gear mechanism.

22. The method of claim 17, wherein the first gear is larger than the second gear.

23. The method of claim 17, wherein a gear ratio of the first gear and the second gear is 1.5:1.

* * * * *